US009030950B2

(12) United States Patent
Morimura

(10) Patent No.: US 9,030,950 B2
(45) Date of Patent: May 12, 2015

(54) COMMUNICATION APPARATUS, PROCESSING METHOD FOR THE SAME, AND COMPUTER-READABLE STORAGE MEDIUM

(75) Inventor: Kazuhiko Morimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 12/963,204

(22) Filed: Dec. 8, 2010

(65) Prior Publication Data
US 2011/0158119 A1      Jun. 30, 2011

(30) Foreign Application Priority Data

Dec. 24, 2009  (JP) ................... 2009-293204
Nov. 1, 2010  (JP) ................... 2010-245703

(51) Int. Cl.
*H04J 3/24* (2006.01)
*H04L 12/26* (2006.01)
*H04L 12/861* (2013.01)
*H04L 1/18* (2006.01)

(52) U.S. Cl.
CPC .......... H04L 49/9094 (2013.01); H04L 1/1841 (2013.01)

(58) Field of Classification Search
CPC ...................... H04L 1/1841; H04L 49/9094
USPC ................................................ 370/252, 474
See application file for complete search history.

(56) References Cited

U.S. PATENT DOCUMENTS

| | | | |
|---|---|---|---|
| 6,714,985 B1 * | 3/2004 | Malagrino et al. ............ 370/394 |
| 2002/0095512 A1 * | 7/2002 | Rana et al. ................... 709/232 |
| 2006/0007935 A1 * | 1/2006 | Bennett et al. ................ 370/394 |
| 2006/0029102 A1 * | 2/2006 | Abe et al. ...................... 370/474 |
| 2006/0039379 A1 * | 2/2006 | Abe et al. ...................... 370/394 |
| 2008/0307114 A1 | 12/2008 | Ooshima et al. |
| 2009/0097425 A1 * | 4/2009 | Sammour et al. ............. 370/310 |
| 2010/0020800 A1 * | 1/2010 | Abe et al. ...................... 370/392 |

FOREIGN PATENT DOCUMENTS

JP        2006081030 A      3/2006

OTHER PUBLICATIONS

Information Sciences Institute University of Southern California, RFC 791 "Internet Protocol Darpa Internet Program Protocol Specification", Sep. 1981.
Information Sciences Institute University of Southern California, RFC 793 "Transmission Control Protocol Darpa Internet Program Protocol Specification", Sep. 1981.

* cited by examiner

*Primary Examiner* — Steven H Nguyen
(74) *Attorney, Agent, or Firm* — Fitzpatrick, Cella, Harper & Scinto

(57) ABSTRACT

A communication apparatus extracts segment data including information defining the position of a fragment packet before fragmentation and the identification information of the fragment packet from the header information of the fragment packet. If the fragment packet is the last fragment packet, the apparatus extracts packet length information before packet fragmentation from the header information of the last fragment packet. A memory stores a segment database holding segment data and information associating identification information with packet length information. The communication apparatus executes integration processing of the segment data based on information stored in the segment database and determines whether the reception of all the fragment packets constituting the packet before fragmentation is complete.

6 Claims, 12 Drawing Sheets

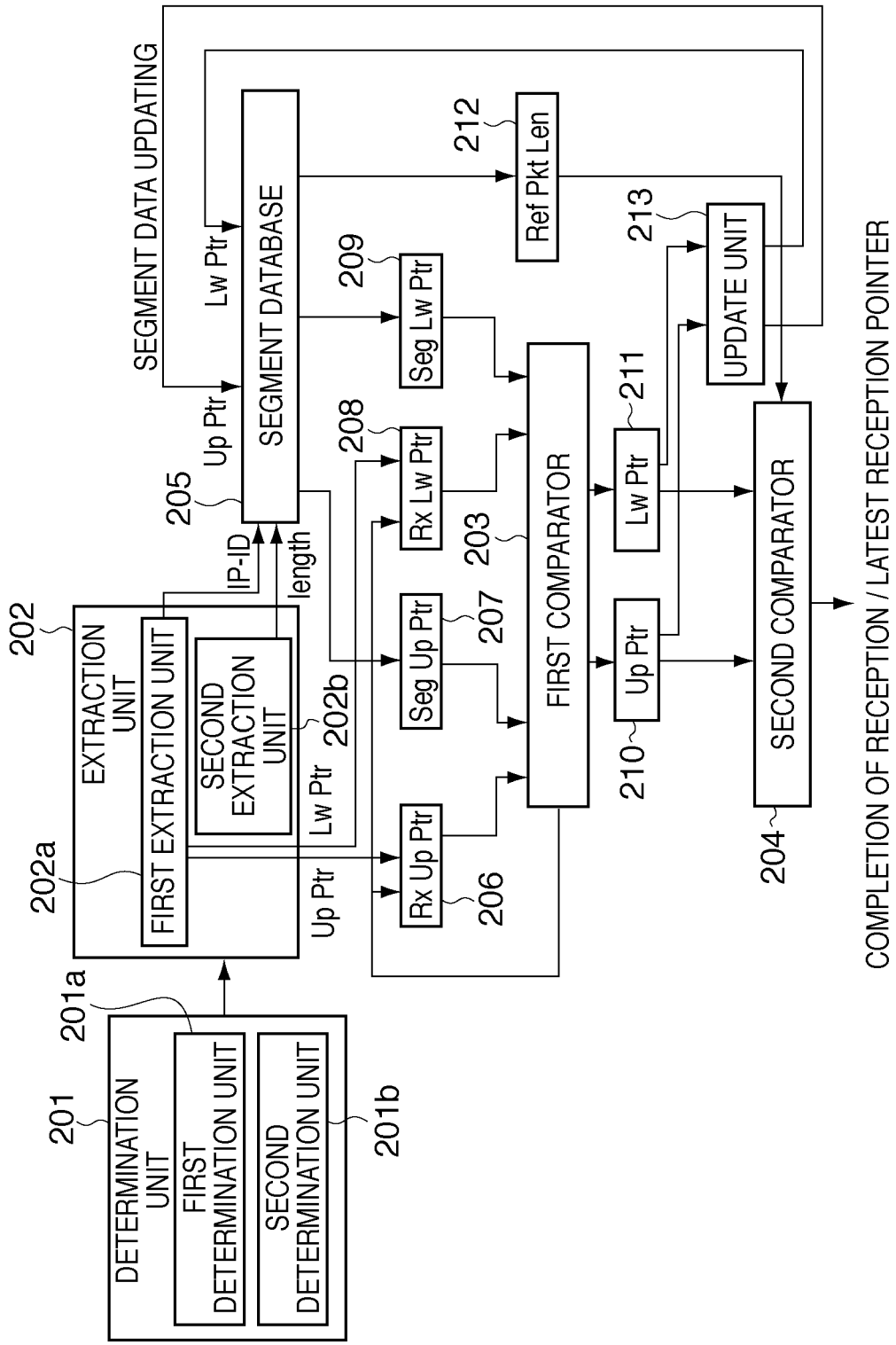

FIG. 5

| ID-2 | UPPER POINTER 2 | LOWER POINTER 2 | ← START ADDRESS 1 |
|---|---|---|---|
| null | | | |
| ID-1 | UPPER POINTER 1-2 | LOWER POINTER 1-2 | |
| ID-3 | UPPER POINTER 3-2 | LOWER POINTER 3-2 | |
| ID-1 | UPPER POINTER 1-3 | LOWER POINTER 1-3 | |
| ID-6 | UPPER POINTER 6 | LOWER POINTER 6 | |
| ID-3 | UPPER POINTER 3-1 | LOWER POINTER 3-1 | |
| ID-1 | UPPER POINTER 1-1 | LOWER POINTER 1-1 | |
| ID-4 | UPPER POINTER 4 | LOWER POINTER 4 | ← END ADDRESS 1 |
| null | | | |
| ID-1 | Ref.PACKET LENGTH | | ← START ADDRESS 2 |
| ID-4 | Ref.PACKET LENGTH | | ← END ADDRESS 2 |
| null | | | |

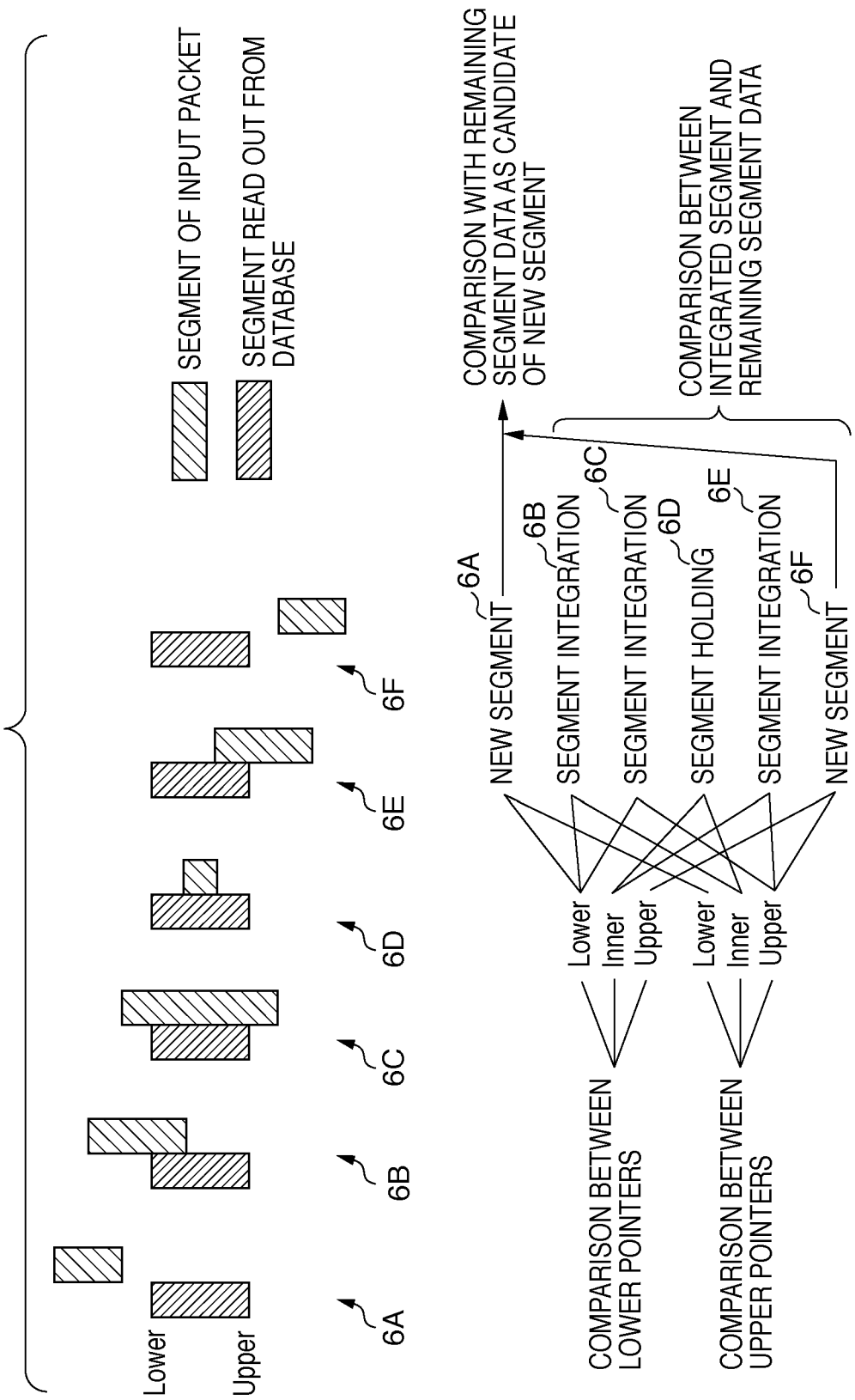

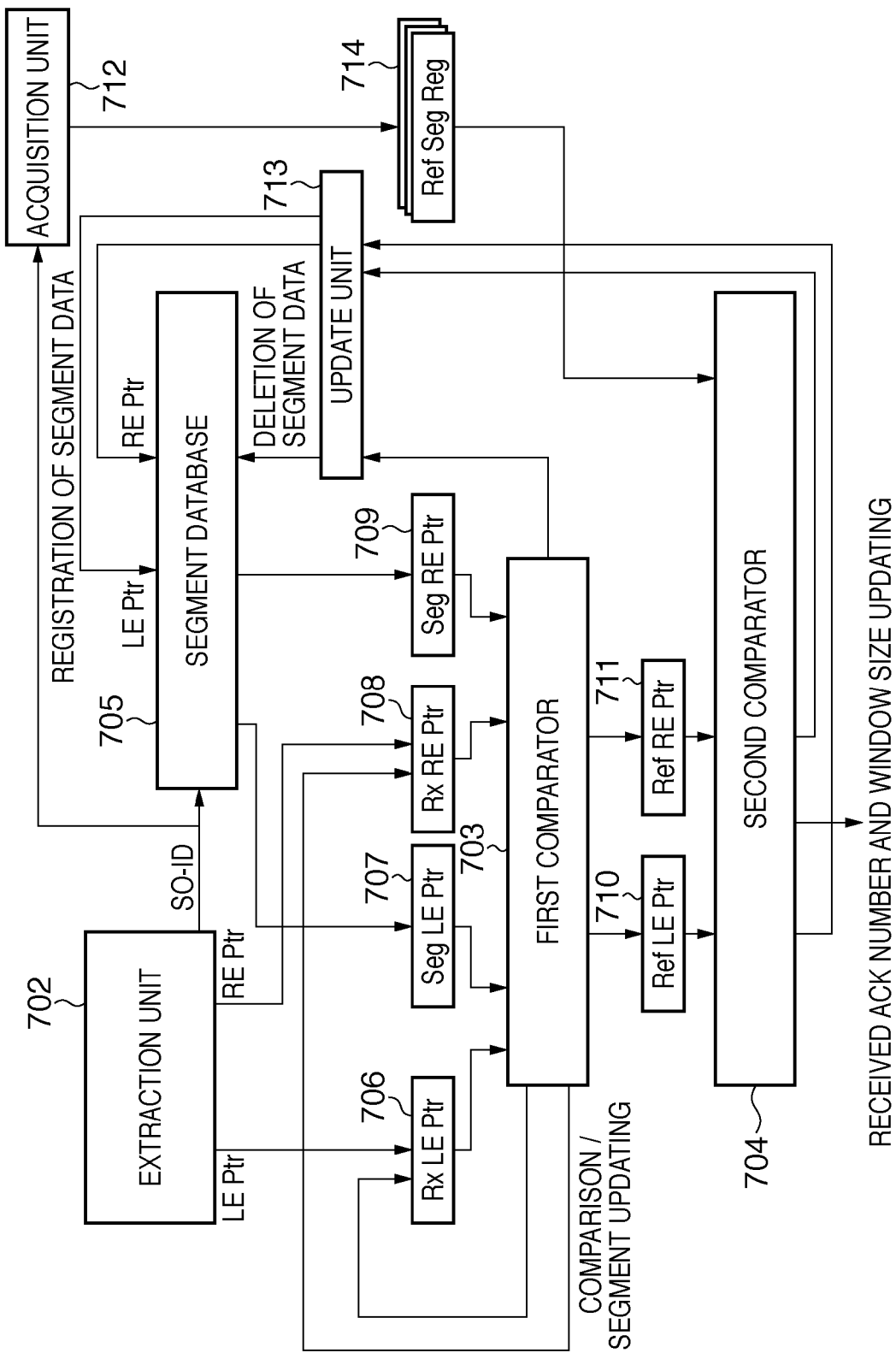

FIG. 12

| | | | |
|---|---|---|---|
| SO-ID-2 | LEFT EDGE POINTER 2 | RIGHT EDGE POINTER 2 | ← START ADDRESS 1 |
| null | | | |
| SO-ID-1 | LEFT EDGE POINTER 1-2 | RIGHT EDGE POINTER 1-2 | |
| IP-ID-3 | LEFT EDGE POINTER 3-2 | RIGHT EDGE POINTER 3-2 | |
| SO-ID-1 | LEFT EDGE POINTER 1-3 | RIGHT EDGE POINTER 1-3 | |
| IP-ID-6 | LEFT EDGE POINTER 6 | RIGHT EDGE POINTER 6 | |
| null | | | |
| IP-ID-3 | LEFT EDGE POINTER 3-1 | RIGHT EDGE POINTER 3-1 | |
| SO-ID-1 | LEFT EDGE POINTER 1-1 | RIGHT EDGE POINTER 1-1 | |
| IP-ID-4 | LEFT EDGE POINTER 4 | RIGHT EDGE POINTER 4 | ← END ADDRESS 1 |
| null | | | |
| IP-ID-3 | Ref.PACKET LENGTH | | ← START ADDRESS 2 |
| IP-ID-4 | Ref.PACKET LENGTH | | ← END ADDRESS 2 |
| null | | | |

COMMUNICATION APPARATUS, PROCESSING METHOD FOR THE SAME, AND COMPUTER-READABLE STORAGE MEDIUM

BACKGROUND OF THE INVENTION

1. Field of the Invention

The present invention relates to a communication apparatus, a processing method for the apparatus, and a computer-readable storage medium.

2. Description of the Related Art

When constructing a network other than Ethernet® or connecting networks having different maximum transfer units (MTUs) to each other, it is necessary to change the TCP/IP packet size in accordance with the network which has the smallest MTU.

In order to solve this problem, RFC 791 (http://www.ietf.org/rfc/rfc0793.txt?number=791) or RFC 793 (http://www.ietf.org/rfc/rfc0793.txt?number=793) has been proposed. RFC 791, which describes IP (Internet Protocol), defines a fragmentation procedure for Internet datagrams and a reconfiguration procedure for them. Using this system allows the user to construct a network without having to be conscious of the difference in MTU between networks. In this case, a relay station which connects the networks to each other fragments a packet, and the receiving side station reconfigures the fragment packets.

In an environment in which networks having different MTUs are connected to each other, when transmitting data from a network having a large MTU to a network having a small MTU, it is impossible to transmit a packet having a large size. RFC 791 described above defines a technique of fragmenting the payload portion of an IP datagram so as to make each fragment portion have a size equal to or smaller than the smaller MTU size.

Fragment packets are generated at the time of transmission from the transmitting side station or relaying to a different network via a router. Fragment packets may reach the receiving side station via a different network. Fragment packets may all have the same size or may have different sizes. Furthermore, there is no guarantee that fragment packets will reach the receiving side station in an orderly sequence.

In the case of receiving fragmented packets out of order, the receiving side station needs to hold the fragment packets received so far in the IP layer until the reconfiguration of the fragment packets into a whole packet is completed. For this reason, the IP layer needs to execute a fragment packet reconfiguration process and the process of determining the completion of the reception of all fragment packets.

A known method of determining the completion of reception uses a linked list. A linked list system extracts the start and end addresses of each fragment packet from its header information (a packet length field and fragment offset field) as linked list information. Every time linked list information is obtained, this system determines, by using existing linked list information, whether the obtained data is continuous data, and updates the start and end data of the link.

The packet length after reconfiguration is known based on the packet length field and fragment offset field of the last packet. It is therefore possible to determine the completion of the reception of fragment packets by comparing the information of the start and end data at a given point of time with the packet length. The technique disclosed in Japanese Patent Laid-Open No. 2006-81030 has proposed a system for updating/storing linked list information on a shift register and generating a reception completion notification.

In a TCP layer, packets are assembled using a technique called reordering based on sequence numbers described in their headers. TCP executes communication using a data stream, and a group of data in the stream is called a segment. A received TCP packet contains a TCP segment and its sequence number indicates the position of the segment. Assembling continuous segments makes it possible to assemble the transmitted TCP stream. However, since there is no guarantee that a packet will reach a destination on a TCP/IP network, the destination notifies a source of an Acknowledgement number as the latest reception position of the stream upon reception of the packet. The source is notified by the returned Acknowledgement number that the destination has received the TCP stream (sliding window).

The above method of determining the completion of the reception of fragment packets has various problems. For example, since the reception order of fragment packets may change, it is necessary to sort existing linked list information according to each packet identification number. For this reason, every time a packet is received, it is necessary to execute sorting, compare the resultant linked list information with the received fragment packet, and integrate or add linked list information.

In an ASIC (Application Specific Integrated Circuit) and the like, when incorporating a module for determining the completion of the reception of fragment packets into the ASIC, it is necessary to provide a dedicated shift register in which bit width or depth is decided in advance. This makes it difficult to increase the size of a system and construct flexible hardware.

SUMMARY OF THE INVENTION

The present invention provides a technique of flexibly performing the reception processing of fragment packets by using a simple arrangement.

According to a first aspect of the present invention there is provided a communication apparatus comprising: a first determination unit configured to determine, based on header information of a received packet, whether the received packet is a fragment packet; a second determination unit configured to determine, based on the header information of the received packet, whether the received packet is a last fragment packet, if the first determination unit determines that the received packet is a fragment packet; a first extraction unit configured to extract segment data including information defining a position of the fragment packet before fragmentation and identification information of the fragment packet from the header information of the fragment packet if the first determination unit determines that the received packet is a fragment packet; a second extraction unit configured to extract packet length information before packet fragmentation from the header information of the received packet if the second determination unit determines that the received packet is the last fragment packet; a memory configured to store a segment database holding the segment data and information associating the identification information with the packet length information; a first comparison unit configured to compare relationships between pieces of information defining the positions of the segment data extracted by the first extraction unit and segment data stored in the segment database which has the same identification information as that of the extracted segment data and execute integration processing of the segment data based on the comparison result; and an update unit configured to update the segment database based on the information defining the position processed by the first comparison unit.

According to a second aspect of the present invention there is provided a communication apparatus comprising: an extraction unit configured to extract segment data including information defining a position of a fragment packet before fragmentation and identification information of the fragment packet from header information of the fragment packet; a memory configured to store a segment database holding the segment data; a first comparison unit configured to compare relationships between pieces of information defining the positions of the segment data extracted by the exaction unit and segment data stored in the segment database which has the same identification information as that of the extracted segment data and execute integration processing of the segment data based on the comparison result; a second comparison unit configured to compare information indicating a continuous reception range of a received fragment packet with information defining the position processed by the first comparison unit and update a received state of the fragment packet based on the comparison result; and an update unit configured to update the segment database based on the information defining the position processed by the first comparison unit.

According to a third aspect of the present invention there is provided a processing method in a communication apparatus, the method comprising: extracting segment data including information defining a position of a fragment packet before fragmentation and identification information of the fragment packet from header information of the fragment packet; storing, in a memory, a segment database holding the segment data; comparing relationships between pieces of information defining the positions of the extracted segment data and segment data stored in the segment database which has the same identification information as that of the extracted segment data and executing integration processing of the segment data based on the comparison result; comparing information indicating a continuous reception range of a received fragment packet with information defining the position obtained by the integration processing and updating a received state of the fragment packet based on the comparison result; and updating the segment database based on the information defining the position obtained by the integration processing.

Further features of the present inventions will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram showing an example of the arrangement of a comparator 105 and memory 107 shown in FIG. 1;

FIG. 5 is a view showing an example of the arrangement of a segment database 205;

FIG. 6 is a view showing an outline of the processing performed by a first comparator 203 shown in FIG. 3;

FIG. 7 is a block diagram showing an example of the arrangement of a comparator 105 and memory 107 according to the second embodiment;

FIG. 12 is a view showing an example of the arrangement of a segment database 705 according to the fourth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
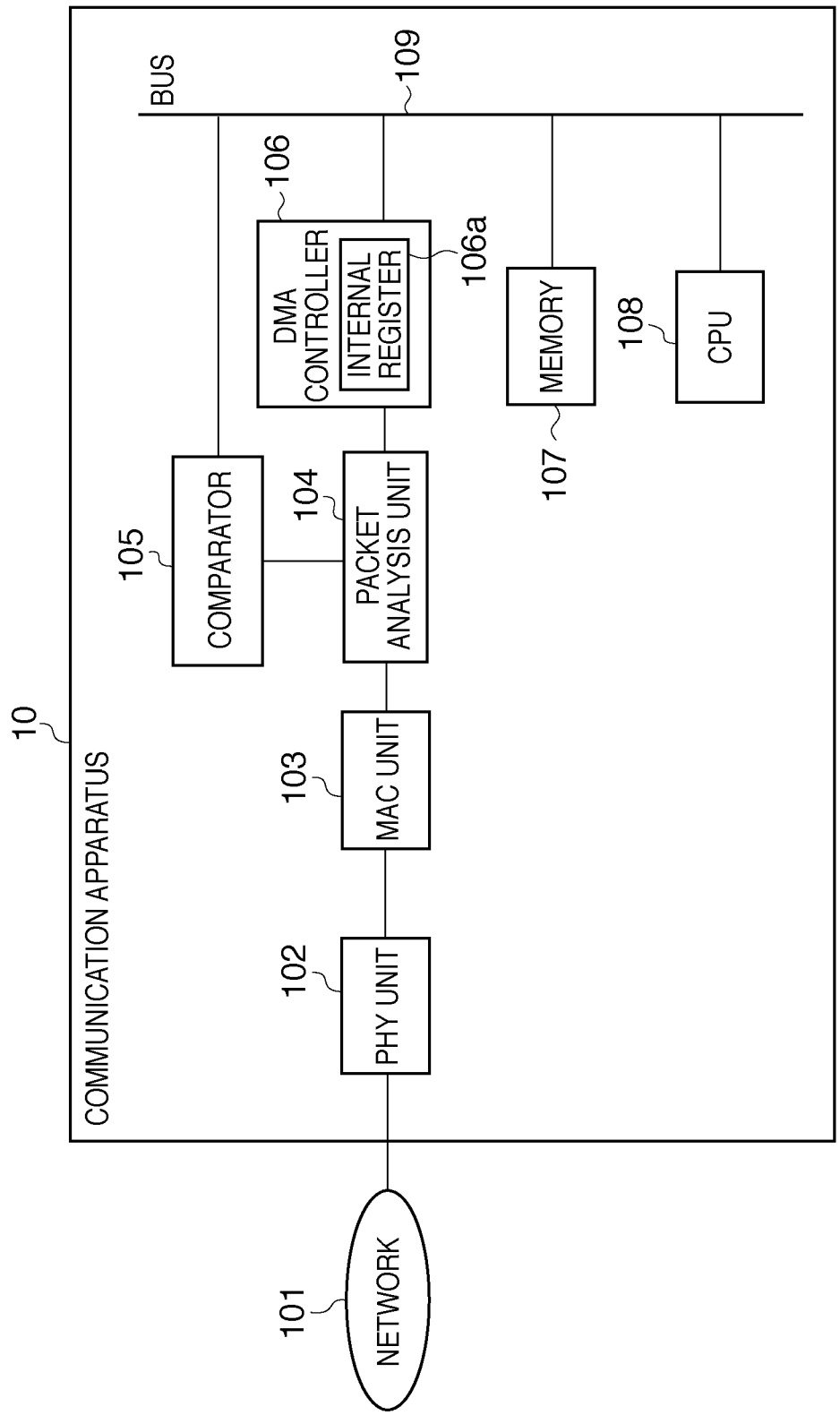
FIG. 1 is a block diagram showing an example of the arrangement of a communication apparatus according to an embodiment of the present invention.

FIG. 1 is a block diagram showing an example of the arrangement of a communication apparatus according to an embodiment of the present invention.

A communication apparatus 10 includes a PHY unit 102, a MAC unit 103, a packet analysis unit 104, a comparator 105, a DMA (Direct Memory Access) controller 106, a memory 107, and a CPU 108.

The communication apparatus 10 is connected to an external medium or the like via a network 101. The PHY unit 102 processes a physical layer. The MAC unit 103 processes a data link layer. The packet analysis unit 104 analyzes packet data (to be abbreviated as a packet hereinafter). The DMA controller 106 DMA-transfers a packet. The comparator 105 determines the completion of the reception of fragment packets. The DMA controller 106 DMA-transfers received packets to the memory 107. Although described in detail later, the DMA controller 106 includes one or a plurality of internal registers 106a.

The memory 107 is implemented by, for example, a RAM (DRAM, SRAM, or the like) or a nonvolatile memory. This memory stores transmission/reception packets and segment data. The CPU 108 comprehensively controls the operation of the communication apparatus 10. A bus 109 connects the respective units in the communication apparatus 10.

An example of a packet according to this embodiment will be described with reference to FIGS. 2A and 2B.

Figure 2A:
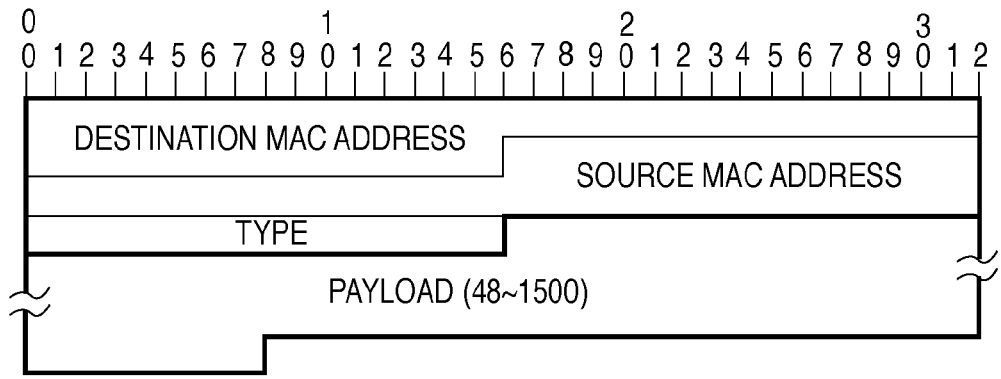
FIGS. 2A and 2B are views each showing an example of a packet according to this embodiment.

FIG. 2A shows an example of the MAC (Media Access Control) header of EthernetII. A MAC header includes a 48-bit destination MAC address field and a 48-bit source MAC address field. The MAC header also includes a 16-bit type field and a payload field of 48 to 1,500 bits. As MAC layer protocols, IEEE802.3, Ethernet packet, and the like are also available. This point is irrelevant to the essential part of this embodiment, and hence a description thereof will be omitted.

Figure 2B:
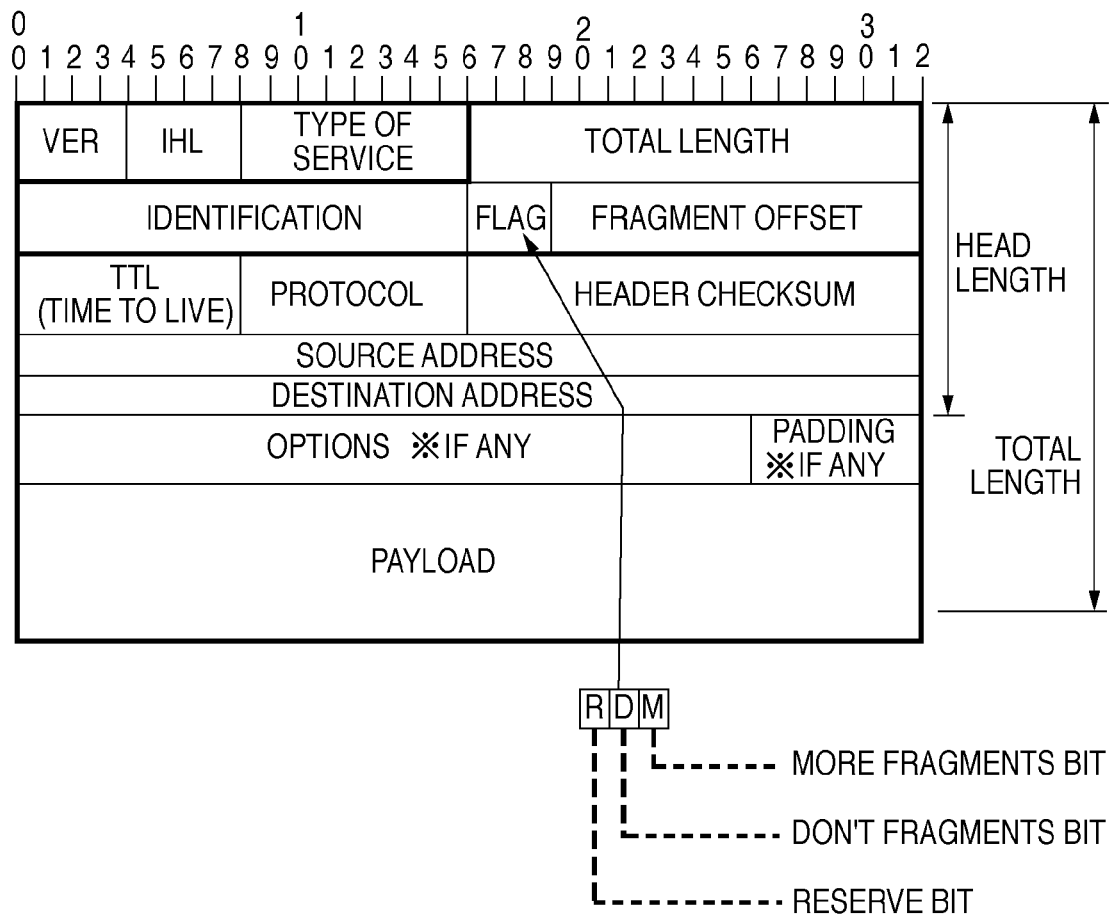

FIG. 2B shows an example of header information. A packet length (total length) field, packet identification number (IP-ID) field, flag field, and fragment offset field will be described below.

A packet length field stores the total length of a packet. A packet identification number field stores a number uniquely identifying a packet. Note that the same packet identification number is assigned to packets constituting the identical data before packet fragmentation.

A flag field has three bits including a reserve bit, DF (Don't Fragment) bit, and MF bit. A reserve bit functions as a preliminary bit when the corresponding field is not used, and is always set to 0 to prepare for extension in the future. A DF bit is a field indicating disapproval of fragmentation. When the DF bit of a received packet is identified as valid, this indicates that the corresponding packet has not been fragmented in the network path.

An MF bit is a field indicating that a fragment packet will follow the corresponding packet. When the MF bit of a received packet is identified as valid, this indicates that the corresponding packet is a fragment packet. Note that the MF bits of fragment packets are all set as valid with the exception of the last fragment packet.

A fragment offset field indicates the position of the corresponding fragment packet in the packet before fragmentation. At the time of reconfiguration, this apparatus specifies the position of an original packet by referring to the fragment offset field. That is, if the MF bit is valid or a value other than "0" is written in the fragment offset field, the corresponding packet is a fragment packet. If the MF bit is not valid and a numerical value is written in the fragment offset field, the corresponding packet is the last fragment packet.

As described above, the communication apparatus 10 can determine, by using a flag field and a fragment offset field, whether the corresponding packet is a fragment packet. Note that the DMA controller 106 DMA-transfers packets other than fragment packets to the memory 107.

FIG. 3 is a block diagram showing an example of the arrangement of the comparator 105 and memory 107 shown in FIG. 1.

The comparator 105 includes a determination unit 201, a first extraction unit 202, a first comparator 203, a second comparator 204, a segment database 205, registers 206 to 212, and an update unit 213.

The determination unit 201 has a function of determining a received packet based on the header information of the packet, and includes a first determination unit 201a and a second determination unit 201b. The first determination unit 201a determines whether a received packet is a fragment packet. The second determination unit 201b determines whether the received packet is the last packet, if the first determination unit 201a determines that the received packet is a fragment packet. Note that these determinations are made based on the flag field and the fragment offset field shown in FIG. 2B.

The first extraction unit 202 has a function of extracting various kinds of information from the header information of a fragment packet, and includes a first extraction unit 202a and a second extraction unit 202b. The first extraction unit 202a extracts the segment data of a fragment packet from the header information of the fragment packet. The segment data is information defining upper and lower pointers indicating the position of the fragment packet in the packet before fragmentation and a packet identification number (IP-ID). The second extraction unit 202b extracts a packet length before fragmentation from the header information of the last fragment packet.

The first comparator 203 compares the segment data of a fragment packet with the segment data stored in the segment database 205. The first comparator 203 then executes integration processing of the segment data based on the comparison result, and outputs the processing result. For example, the first comparator 203 outputs the upper and lower pointers of the segment data after integration as the processing result. In segment data integration processing, for example, the segment data of a fragment packet is integrated with the segment data in the database. Note that in some cases, the first comparator 203 stores the segment data of a fragment packet as new segment data in the database without integrating the segment data.

When the second extraction unit 202b extracts a packet length, the second comparator 204 compares the packet length with the processing result (the upper and lower pointers after integration) obtained by the first comparator 203. The second comparator 204 determines, based on the comparison result, whether all the fragment packets constituting the packet before fragmentation have been completely received.

The update unit 213 updates the segment database 205 based on the processing result obtained by the first comparator 203. Although described in detail later, the segment database 205 stores the segment data. That is, the segment database 205 stores a data set in which the upper pointer, the lower pointer, and the packet identification number are associated with each other. Note that the segment database 205 is implemented by a partial area of the memory 107.

The registers 206 to 212 temporarily store outputs from the respective units. The Rx_UP_Ptr register 206 stores the upper pointer of the segment data of a fragment packet. The Rx_Lw_Ptr register 208 stores the lower pointer of the segment data of the fragment packet. The Seg_Up_Ptr register 207 stores the upper pointer of the segment data stored in the segment database 205. The Seg_Lw_Ptr register 209 stores the lower point of the segment data stored in the segment database 205.

The Up_Ptr register 210 stores the upper pointer of the segment data output from the first comparator 203. The Lw_Ptr register 211 stores the lower pointer of the segment data output from the first comparator 203. The Ref_Pkt_Len register 212 stores the packet length obtained from integrated segment data. The register 212 stores the total length of a packet (packet length) after reconfiguration upon reception of the last fragment packet (in which the MF bit is 0 and a significant numerical value is written in the fragment offset field). When the register 212 stores the packet length, the second comparator 204 determines that all the fragment packets have been completely received.

Figure 4:
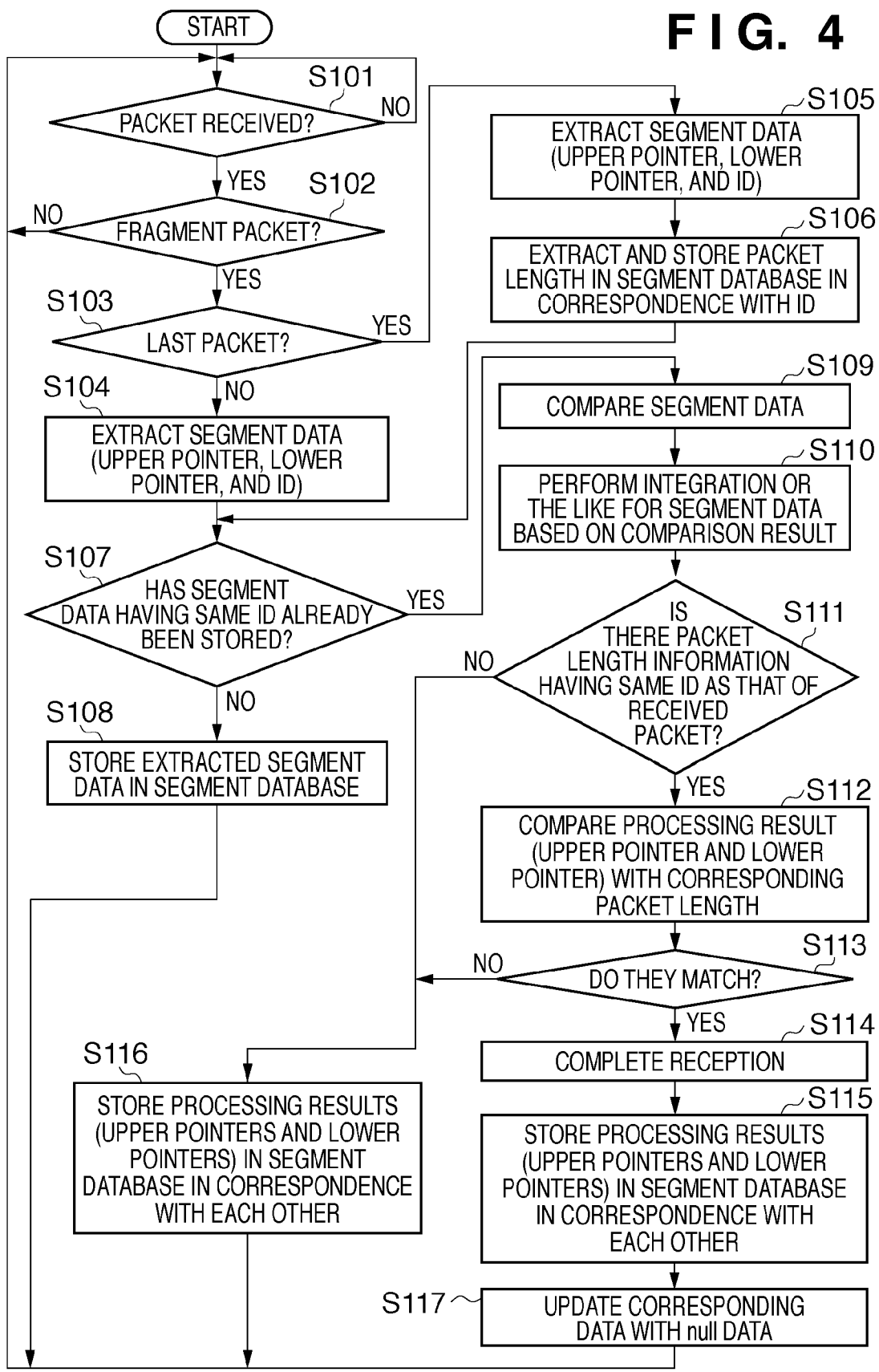
FIG. 4 is a flowchart showing an example of the operation of the communication apparatus shown in FIG. 1.

An example of the operation of the communication apparatus shown in FIG. 1 will be described next with reference to FIG. 4. Operation at the time of packet reception (method of determining the completion of packet reception) will be described below.

When a packet is sent, the communication apparatus 10 receives it via the PHY unit 102, and demodulates it (YES in step S101). Note that a packet is sent to the communication apparatus 10 via various kinds of switches and a relay station such as a router (not shown).

Upon receiving the packet, the communication apparatus 10 causes the MAC unit 103 to convert the packet into an Ethernet packet like that shown in FIG. 2A. Assume that the MAC address of the self station is written in the destination MAC address field and (0x0800) indicates that the IPv4 protocol is written in the type field. In this case, the MAC unit 103 outputs the payload field of the packet as an IPv4 packet to the packet analysis unit 104. Upon receiving this packet, the packet analysis unit 104 analyzes the header information.

The communication apparatus 10 then causes the first determination unit 201a to determine whether the packet received in step S101 is a fragment packet. If the first determination unit 201a determines that the received packet is not a fragment packet (NO in step S102), the process returns to the process in step S101 to wait for the reception of a packet.

If the received packet is a fragment packet (YES in step S102), the communication apparatus 10 causes the second determination unit 201b to further determine whether the packet is the last packet. If the packet is not the last packet (NO in step S103), the communication apparatus 10 causes the first extraction unit 202a to extract segment data (the upper point, lower pointer, and packet identification number (IP-ID)) from the header information of the fragment packet (S104). Note that the upper and lower pointers are respectively stored in the Rx_UP_Ptr register 206 and the Rx_Lw_Ptr register 208.

If the packet is the last packet (YES in step S103), the communication apparatus 10 causes the first extraction unit 202a to extract segment data from the header information of the fragment packet in the same manner as described above (S105). The second extraction unit 202b then extracts packet length information from the header information of the fragment packet (S106). Note that the upper and lower pointers are respectively stored in the Rx_UP_Ptr register 206 and the Rx_Lw_Ptr register 208. In addition, the packet length information is stored in the segment database 205 in correspondence with the packet identification number. The DMA controller 106 stores these pieces of information in the above registers.

The communication apparatus 10 then searches the segment database 205 for segment data matching the packet identification number of the received packet. More specifically, the DMA controller 106 sequentially outputs the upper and lower pointers of data matching the packet identification number in the segment data stored in the segment database 205 to the registers 207 and 209. With this operation, the upper and lower pointers are respectively stored in the Seg_Up_Ptr register 207 and the Seg_Lw_Ptr register 209. Note that the DMA controller 106 outputs such upper and lower pointers every time the first comparator 203 performs comparison processing, and repeatedly outputs such data until there is no segment data having the same packet identification information.

In this case, the communication apparatus 10 causes the first comparator 203 to compare the address information stored in the registers 207 and 209 with the address information stored in the registers 206 and 208. With this operation, the first comparator 203 compares the segment data in the segment database 205 with the segment data extracted from the received packet.

The processing to be performed when the first fragment packet is received will be described first. At the time of the reception of the first fragment packet, the segment database 205 has stored no segment data which has a packet identification number matching the identification number of the received packet (NO in step S107). For this reason, the Seg_Up_Ptr register 207 and the Rx_Lw_Ptr register 208 store null. In this case, the first comparator 203 outputs the address information stored in the Seg_Up_Ptr register 207 and the Rx_Lw_Ptr register 208 to the Up_Ptr register 210 and the Lw_Ptr register 211 without performing comparison processing. If the first fragment packet is not the last packet, since the total length of the packet before fragmentation is unknown, the Ref_Pkt_Len register 212 stores null, and the second comparator 204 executes no comparison processing. Thereafter, the update unit 213 stores a data set in which the address information stored in the registers 210 and 211 is associated with the packet identification number, as segment data, in the segment database 205 (S108). The communication apparatus 10 then returns to the processing in step S101 to wait for the reception of a packet.

A case in which the segment database 205 stores segment data having a packet identification number matching the identification number of a received packet (YES in step S107) will be described below. In this case, the communication apparatus 10 causes the first comparator 203 to compare the lower pointers stored in the Rx_Lw_Ptr register 208 and the Seg_Lw_Ptr register 209. The first comparator 203 also compares the upper pointers stored in the Rx_UP_Ptr register 206 and the Seg_Up_Ptr register 207 (S109). With this operation, the first comparator 203 compares the relationships between pieces of information defining the positions of the segment data. The first comparator 203 executes segment data integration processing based on a combination of these comparison results, and outputs the information after the processing (the upper and lower pointers) to the registers 210 and 211 (S110). The first comparator 203 repeats this comparison until there is no segment data having the same packet identification information. Segment data integration processing will be described in detail later.

When the first comparator 203 completes comparison processing, the communication apparatus 10 causes the DMA controller 106 to determine whether packet length information having the same packet identification number as that of the received packet is stored in the segment database 205. If this information is stored in the segment database 205 (YES in step S111), the DMA controller 106 stores the packet length information in the Ref_Pkt_Len register 212. With this operation, the communication apparatus 10 causes the second comparator 204 to compare the packet length information stored in the register 212 with the processing result (the upper and lower pointers) obtained by the first comparator 203 (S112) and determine whether the data lengths represented by the two pieces of information match each other.

If they match each other (YES in step S113), the communication apparatus 10 causes the second comparator 204 to determine whether all the fragment packets constituting the packet before fragmentation have been completely received (S114). The communication apparatus 10 causes the update unit 213 to update the segment database 205 based on the processing result obtained by the first comparator 203. That is, the communication apparatus 10 stores the data set which associates the processing result (the upper and lower pointers) obtained by the first comparator 203 with the packet identification number as segment data in the segment database 205 (S115). The update unit 213 updates the data corresponding to the packet identification number with null data (S117). Subsequently, the communication apparatus 10 returns to the processing in step S101 to wait for the reception of a packet.

If there is no corresponding packet length information in step S111 (NO in step S111), and the two data lengths do not match each other in step S113 (NO in step S113), the communication apparatus 10 causes the update unit 213 to perform update processing. That is, the update unit 213 stores the processing result (the upper and lower pointers) obtained by the first comparator 203 and data set associated with the packet identification number as segment data in the segment database 205 (S116). In this case, since null is stored in the Ref_Pkt_Len register 212, the communication apparatus 10 does not cause the second comparator 204 to execute comparison processing. Subsequently, the communication apparatus 10 returns to the processing in step S101 again to wait for the reception of a packet.

The operation of the communication apparatus 10 has been described above. However, the processing procedure described above is merely an example, and the order of processing may be changed. For example, the DMA controller 106 may store packet length information in the Ref_Pkt_Len register 212 at the same timing as the reception of a fragment packet.

An outline of the segment data integration processing performed by the first comparator 203 in steps S109 and S110 in FIG. 4 will be described next with reference to FIGS. 5 and 6. An example of the arrangement of the segment database 205 will be described first with reference to FIG. 5.

The segment database 205 stores the segment data extracted and calculated from fragment packets. The segment database 205 has areas "start address 1" to "end address 1" in which segment data are written. The DMA controller 106 stores pieces of information indicating "start address 1" and "end address 1" in the internal register 106a. The DMA controller 106 can transfer the segment data in the segment database 205 to the comparator 105 when performing the first comparison.

The segment database 205 stores packet length information indicating the packet length of the packet after reconfiguration and the packet identification number (IP-ID) in correspondence with each other. These pieces of information are stored in areas "start address 2" to "end address 2". The DMA controller 106 stores pieces of information indicating "start address 2" and "end address 2" in the internal register 106a. For this reason, the DMA controller 106 can DMA-transfer the information stored in the segment database 205 to the comparator 105 when performing the second comparison.

The DMA controller 106 stores a writable address (WritableAddress) in the internal register 106a. The writable address is the address of an area (the address near the lowest-order address (start address 1)) in which no packet identification number is registered. A new segment is registered in this area. If there is no non-registration area, the internal register 106a holds the address represented by "end address 1"+1 as a writable address. At this time, the internal register 106a also stores the value obtained by incrementing the value of "end address 1" by one. This can keep registration areas for segment data corresponding to "start address 1" to "end address 1" compact, and hence can suppress an increase in the transfer time of segment data.

An outline of the segment data integration processing performed by the first comparator 203 will be described next with reference to FIG. 6.

In this processing, the first comparator 203 compares the lower and upper pointers of segment data with those of another segment data. With this operation, the first comparator 203 performs pattern classification like that shown in FIG. 6. Patterns 6A and 6F each show a case in which two segment data as comparison targets have no common interval. Patterns 6B, 6C, and 6E each show a case in which there is a common or continuous segment area between two segments as comparison targets. A pattern 6D shows a case in which received segment data has already been received, and there is no need to change the segment data in the segment database 205. Note that the first comparator 203 compares received segment data with all the segment data in the segment database and classifies the data into such patterns.

In the cases of the patterns 6B, 6C, and 6E, the first comparator 203 integrates the segment data. When performing this integration, the first comparator 203 outputs the upper and lower pointers of the segment data after integration. With this operation, the Rx_UP_Ptr register 206 stores the upper pointer after integration. The Rx_Lw_Ptr register 208 stores the lower pointer after integration. The first comparator 203 continues comparison processing for the remaining data up to "end address 1".

If there are two or more segment data as integration targets in the segment database 205, the first comparator 203 integrates received segment data with the first corresponding segment data. Subsequently, the first comparator 203 executes integration for the remaining data as integration targets. Note that null is stored in an area in which the remaining data as an integration target has been stored. If, for example, null is written in the "end address 1" area, the DMA controller 106 decrements the corresponding value held in the internal register 106a by "1".

In the cases of the patterns 6A and 6F, even when all the segment data stored at "start address 1" to "end address 1" are completely compared with each other, there is no segment data to be integrated. In this case, the segment database 205 stores the segment data as new segment data.

As described above, this embodiment is configured to compare segment data including the position of a fragment packet before packet fragmentation and the identification information of the fragment packet with the segment data of a fragment packet which has already been received, and determines the completion of the reception of fragment packets.

In this case, the segment data of fragment packets which have already been received are managed in the segment database defined in the memory. For this reason, the capacity of the memory area in which segment data are managed can be changed by only rewriting the register (storing information defining an area in the segment database).

This makes it possible to determine the completion of the reception of fragment packets by using a simple, flexible arrangement. In addition, since the segment database is managed by using the memory, the apparatus is allowed to have an inexpensive arrangement, and can flexibly cope with an increase in capacity. Furthermore, the number of fragment packets to be simultaneously reconfigured can be increased by rewriting only the register which defines an area in the segment database.

In general, connecting a memory device to the outside of ASIC to construct a system will decrease the cost per bit more than providing a shift register in ASIC. The arrangement of this embodiment can therefore suppress an increase in cost. In addition, it is possible to change the memory device without redesigning ASIC.

(Second Embodiment)

The second embodiment will be described next. The second embodiment will exemplify an arrangement for determining the received state of a TCP packet instead of an IP packet. Note that a description of the same arrangement as that of the first embodiment will be omitted, and the following is a description mainly of the differences between the embodiments.

FIG. 7 is a block diagram showing an example of the arrangement of a comparator 105 and memory 107 in a communication apparatus 10 according to the second embodiment.

An extraction unit 702 extracts segment data from a TCP header and an IP header. More specifically, the extraction unit 702 extracts a socket ID, the sequence number of a TCP header, and the next sequence number as information defining the reception range of fragment packets (information indicating the specific position of the corresponding data in the entire stream). The extraction unit 702 extracts the sequence number as a left edge pointer, and the next sequence number as a right edge pointer. Note that a socket ID (SO-ID) is uniquely decided from a socket pair as a combination of the transmission source-designation IP address of the IP header of the received packet and the transmission source-destination port number of the TCP header.

A segment database 705 stores the segment data of TCP packets during reordering. More specifically, the segment database 705 stores segment data in correspondence with socket IDs.

A first comparator 703 compares the segment data of a received TCP packet with the segment data stored in the segment database 705. The first comparator 703 then executes segment data integration processing based on the comparison result, and outputs the processing result. The first comparator 703 outputs, as the processing result, for example, the left edge pointer and right edge point of the segment data after integration.

An update unit 713 updates a segment database 205 based on the processing result obtained by the first comparator 703.

A second comparator 704 compares the processing result (the left edge pointer and right edge pointer after integration) obtained by the first comparator 703 with information indicating the continuous reception range of fragment packets which have already been received (window left edge information and a received ACK number). The second comparator 704 then updates the received state of the fragment packets (the received ACK number and the window size information) based on the comparison result. Note that the updated information is notified to a communication partner to which a packet is to be transmitted next.

Figure 8:
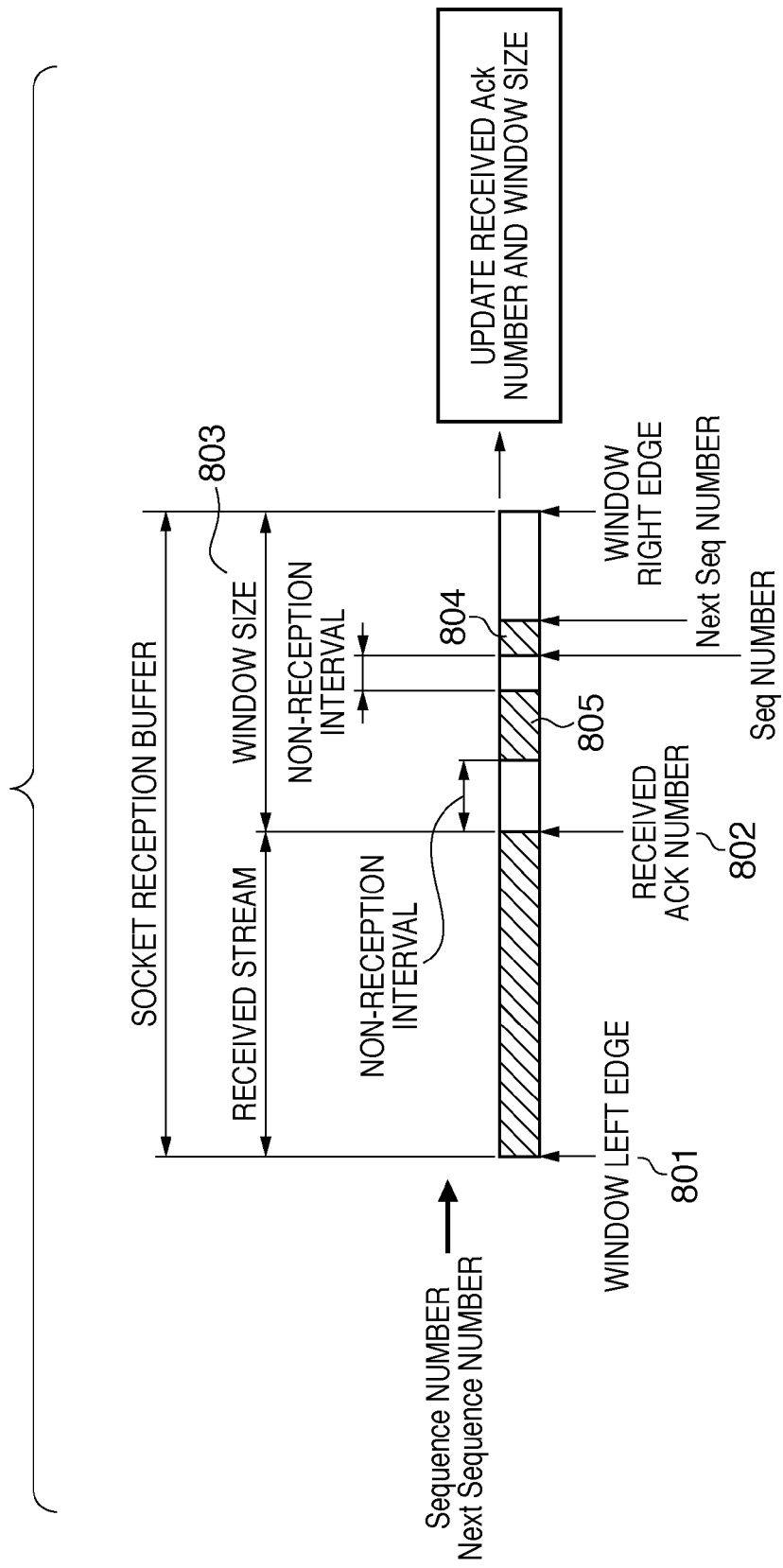
FIG. 8 is a view showing an outline of TCP window processing.

In this case, window size indicates the maximum data size that can be transmitted, window left edge information indicates a window left edge 801 in FIG. 8, and a received ACK number indicates a received ACK number 802 in FIG. 8. The received ACK number is updated when data are continuously received from the window left edge 801, and increases in accordance with the number of bytes of received data. In contrast to this, the window size decreases with an increase in ACK number, as indicated by reference numeral 803 in FIG. 8.

Assume that this apparatus has received segment data 804 and 805 in FIG. 8. In this case, the segment data 804 and 805 are not in contact with the position indicated by the received ACK number 802. For this reason, in such a case, the received ACK number is not updated. In this case, the update unit 713 newly registers the segment data 804 and 805 in the segment database 705.

Registers 706 to 711 temporarily store outputs from the respective units. The Rx_LE_Ptr register 706 stores the left edge pointer of the segment data of a received TCP packet. The RX_RE_Ptr register 708 stores the right edge pointer of the segment data of the received TCP packet. The Seg_LE_Ptr register 707 stores the left edge pointer of the segment data stored in the segment database 705. The Seg_RE_Ptr register 709 stores the right edge pointer of the segment data stored in the segment database 705.

The Ref_LE_Ptr register 710 stores the left edge pointer of the segment data output from the first comparator 703. The Ref_RE_Ptr register 711 stores the right edge pointer of the segment data output from the first comparator 703. A Ref_Seg_Reg register 714 stores window left edge information and a received ACK number. An acquisition unit 712 acquires these pieces of information from the upper layer of TCP.

A processing procedure in the communication apparatus 10 according to the second embodiment will be briefly described below.

First of all, upon receiving a TCP packet, the communication apparatus 10 causes the extraction unit 702 to extract a sequence number, next sequence number, and socket ID. The communication apparatus 10 stores the sequence number and the next sequence number in the registers 706 and 708, respectively. The socket ID is output to the segment database 705 to be compared with the segment data in the segment database 705.

The segment database 705 stores segment data in correspondence with socket IDs. The communication apparatus 10 searches the segment database 705 for segment data matching the socket ID of the received segment data. More specifically, a DMA controller 106 sequentially outputs the left edge pointer and right edge pointer of the segment data, of the segment data stored in the segment database 705, which matches the socket ID, to the registers 707 and 709. With this operation, the Seg_LE_Ptr register 707 stores the left edge pointer, and the Seg_RE_Ptr register 709 stores the right edge pointer.

When the registers 707 and 709 store values, the communication apparatus 10 causes the first comparator 703 to compare the address information stored in the registers 707 and 709 with the address information stored in the registers 706 and 708. With this operation, the first comparator 703 compares the segment data in the segment database 705 with the segment data extracted from the TCP packet. With this comparison, the first comparator 703 determines a new segment, segment integration, segment retention, and the like in the same manner as in the processing described in the first embodiment.

Upon completion of the comparison between the received segment data and the data in the segment database 705, the communication apparatus 10 stores the comparison results in the registers 710 and 711, respectively. Note that when integrating segment data, the communication apparatus 10 deletes the corresponding segment data from the segment database 705. That is, the communication apparatus 10 updates the corresponding data with null data. In this case, for example, upon obtaining a comparison result like that indicated by the pattern 6D in FIG. 6, the communication apparatus 10 stores the updated address information in the registers 706 and 708, and causes the first comparator 703 to continue comparison processing, as in the first embodiment.

Upon completing the comparison processing, the first comparator 703 stores the comparison results in the registers 710 and 711, respectively. The communication apparatus 10 then causes the second comparator 704 to perform comparison processing.

In this case, the second comparator 704 receives window left edge information and a received ACK number. The communication apparatus 10 causes the second comparator 704 to compare these pieces of information with the address information stored in the registers 710 and 711. The second comparator 704 updates the window left edge information corresponding to the current socket and the ACK (Acknowledgement) number based on the comparison result, and outputs the resultant information.

As described above, according to the second embodiment, the communication apparatus (the TCP reception segment processing apparatus) compares segment data defining the reception range of TCP packets with the segment data of a TCP packet which has already been received. This makes it possible to determine (update) the received state of the TCP packet.

As in the first embodiment, segment data are managed in the segment database defined in the memory. For this reason, the capacity of the memory area in which segment data are managed can be changed by only rewriting the register (storing information defining an area in the segment database). This makes it possible to determine the received states of TCP packets by using a simple, flexible arrangement. In addition, as in the first embodiment, the apparatus is afforded an inexpensive arrangement, and can flexibly cope with an increase in capacity.

(Third Embodiment)

The third embodiment will be described next. In the second embodiment, received TCP packets are assembled in the reception buffer. However, the present invention is not limited to this technique. For example, there is known a technique of constructing a linked list and tracking the linked list up to the sequence number of an assembled packet, thereby notifying the upper layer of the received state of the TCP packet.

The execution of this processing requires many resources for linked list processing for the reconfiguration of the respective segments in addition to reception notification by integration processing of segment data described in the second embodiment. The third embodiment will therefore exemplify an arrangement configured to reduce the processing load of the linked list of segment data.

Figure 9:
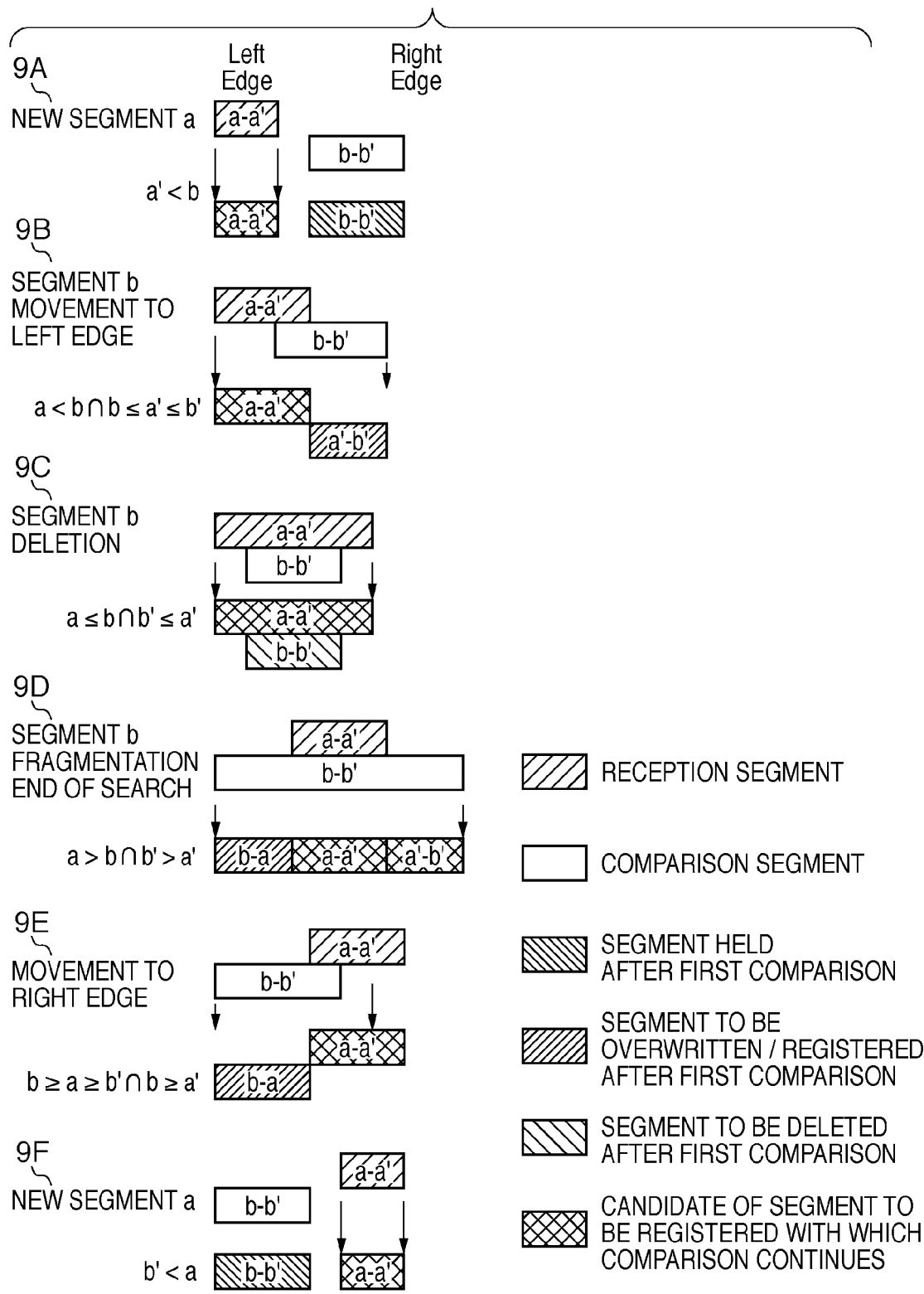
FIG. 9 is a view showing an outline of the processing performed by a first comparator 703 according to the third embodiment.

FIG. 9 is a view showing an outline of the processing performed by a first comparator 703 according to the third embodiment. The first and second embodiments each have exemplified the case in which the completion of the reception of packets is determined by integrating segment data, and a received ACK number and the like are updated. In contrast to this, the third embodiment is configured to change the values of the left edge pointer and right edge pointer of segment data in a segment database 705 without integrating segment data.

As indicated by patterns 9B, 9D, and 9E, when received segment data and the segment data read out from the segment database 705 have an overlapping area, the left edge pointer and right edge pointer of the segment data are changed. When receiving TCP packets, if segment data overlap, this apparatus regards segment data received later in chronological order as received data. For this reason, the apparatus corrects the segment data read out from the segment database 705.

Assume that received segment data has no overlapping area with respect to all the segment data in the segment database 705, as indicated by patterns 9A and 9F. In this case, the received segment data is registered as a new segment in the segment database 705.

Figure 10:
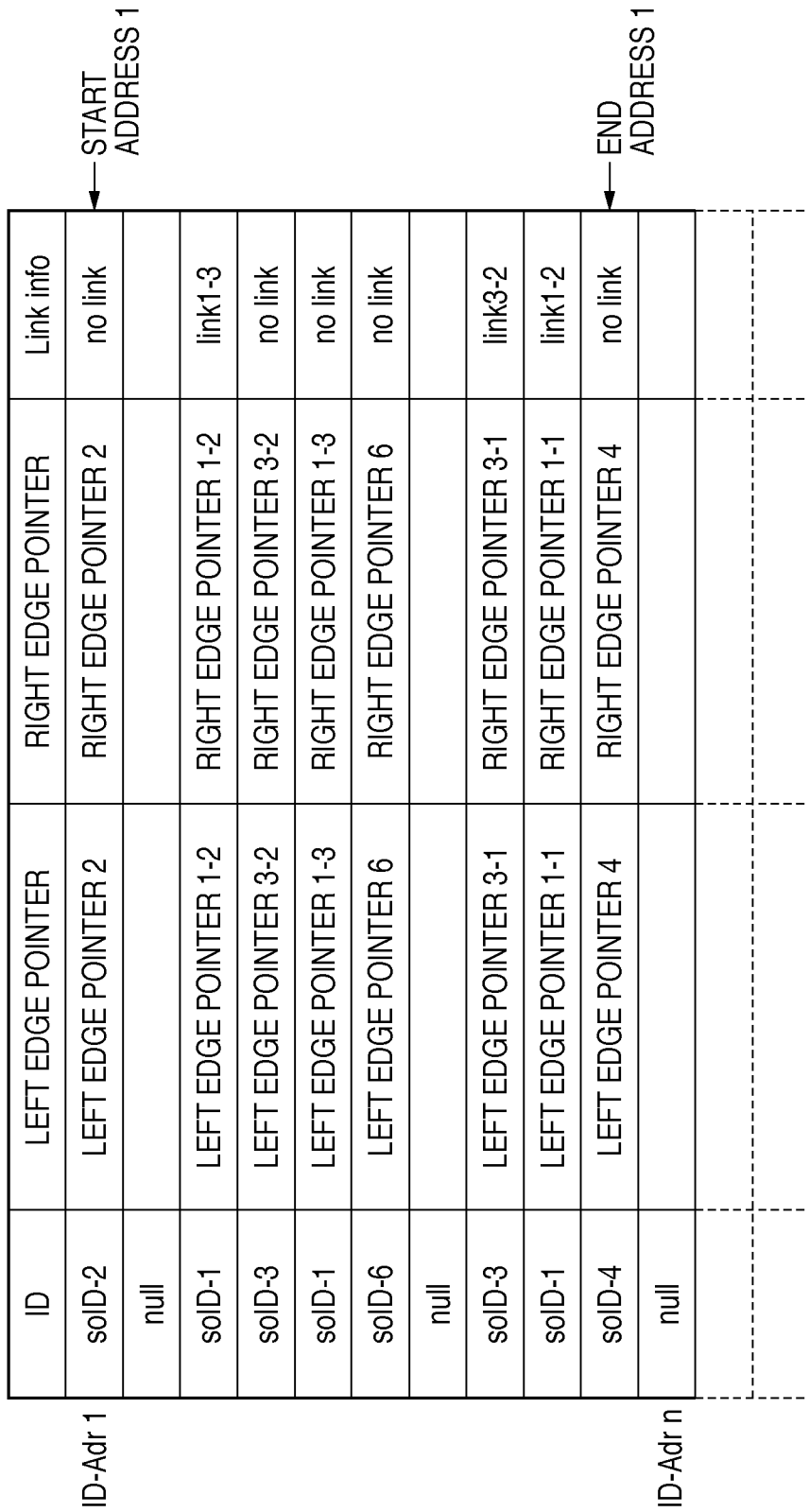
FIG. 10 is a view showing an example of the arrangement of a segment database 705 according to the third embodiment.

Assume that received segment data overlaps segment data in the segment database 705, as indicated by a pattern 9C. In this case, the apparatus deletes the corresponding data from the segment database 705. In the segment database 705, as shown in FIG. 10, the pieces of address information of adjacent segments are added as link information, in addition to the address information of segment data itself. Reading one segment data will write the address information of segment data to be linked next. For this reason, the communication apparatus 10 can form segment data by tracking this list.

As described above, according to the third embodiment, the apparatus can manage linked list information of received segment data at high speed, as well as managing the reception window described in the second embodiment, without using any processor resources.

(Fourth Embodiment)

The fourth embodiment will be described next. The fourth embodiment will exemplify a case in which the first embodiment (determination of the completion of the reception of IP packets) and the second embodiment (determination of the received states of TCP packets) are executed by one arrangement.

Figure 11:
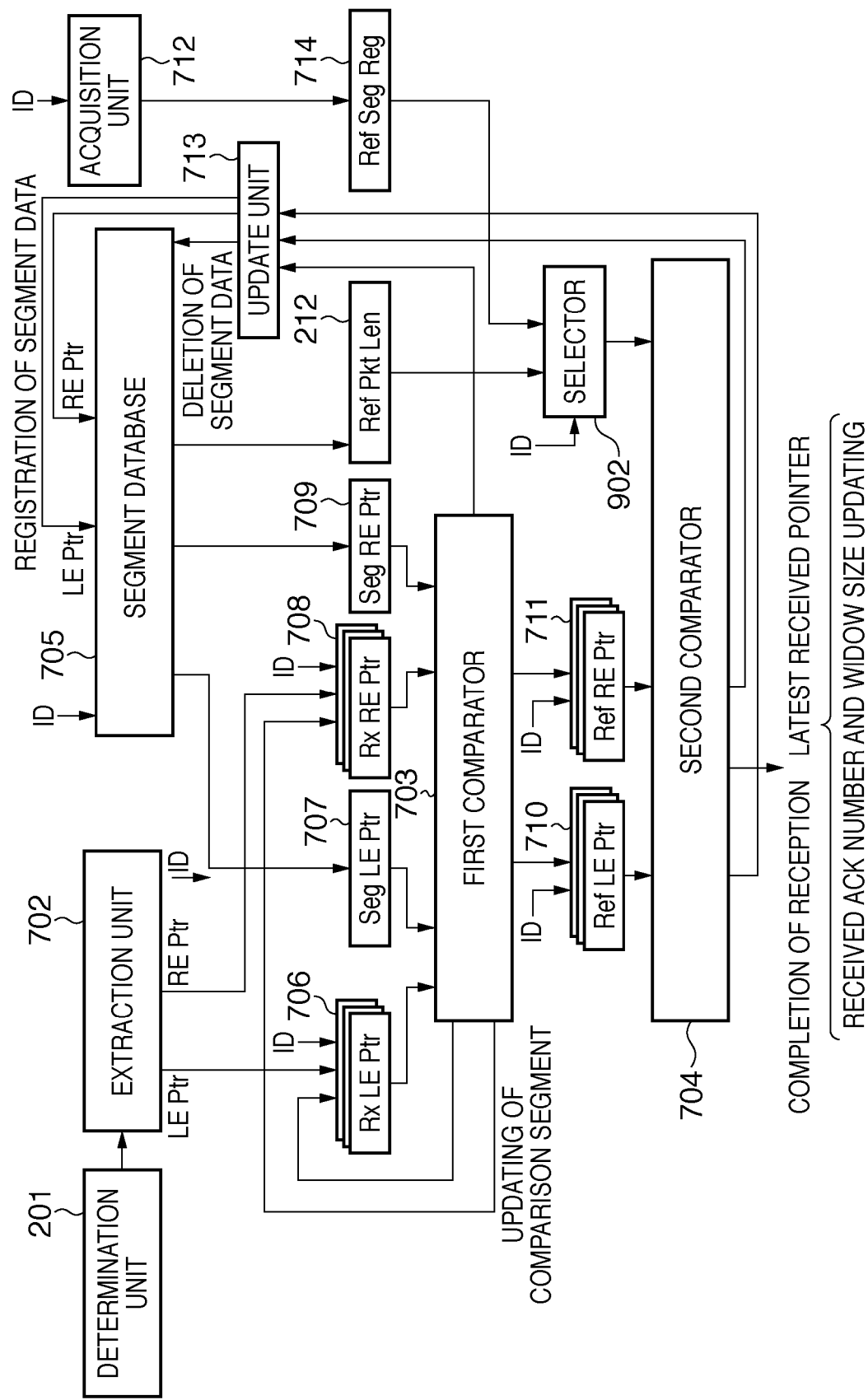
FIG. 11 is a block diagram showing an example of the arrangement of a comparator 105 and memory 107 according to the fourth embodiment.

An example of the arrangement of a comparator 105 and memory 107 in a communication apparatus 10 according to the fourth embodiment will be described with reference to FIG. 11. That is, an arrangement configured to perform reconfiguration processing described in the first embodiment and reordering processing described in the second embodiment will be described.

A selector 902 selects either a Ref_Pkt_Len register 212 or a Ref_Seg_Reg register 714, and inputs the value stored in the selected register to a second comparator 704. More specifically, the selector 902 selects the Ref_Pkt_Len register 212 when processing IP packets, and selects the Ref_Seg_Reg register 714 when processing TCP packets. Note that the selector 902 decides to select a specific register based on the ID number to be described later.

The fourth embodiment includes a plurality of registers 706, 708, 710, and 711 storing address information associated with received segment data. This makes it possible to perform a plurality of comparisons by reading out segment data from a segment database 705 once.

An extraction unit 702 according to the fourth embodiment has the function of the first extraction unit 202 shown in FIG. 3 described in the first embodiment in addition to the function described in the second embodiment. The extraction unit 702 according to the fourth embodiment extracts information such as various kinds of addresses and also assigns unique ID numbers (identification information) to an IP-ID used to process an IP packet and an SO-ID to be used to process a TCP packet.

A processing procedure in the communication apparatus 10 according to the fourth embodiment will be briefly described.

First of all, the communication apparatus 10 causes a determination unit 201 to determine a received packet based on the header information of the packet. In the case of an IP packet, a fragment packet is a processing target. In the case of a TCP packet, a socket which has established connection is a processing target.

The communication apparatus 10 then causes the extraction unit 702 to extract information such as various kinds of addresses from a received packet, and assigns unique ID numbers to an IP-ID used to process an IP packet and an SO-ID to be used to process a TCP packet. These ID numbers are input to the segment database 705, the registers 706 and 708 for received segment data, and the selector 902.

FIG. 12 shows an example of the arrangement of the segment database 705 according to the fourth embodiment. ID numbers and segment data are registered in the segment database 705 in correspondence with the respective records, as shown in FIG. 5 which explains the first embodiment. The segment data of fragment IP packets and the segment data of TCP packets may be registered in the same database if they can be identified by ID numbers.

A plurality of registers for received segment data, including the registers 706 and 708, are provided for, for example, each ID number. The values stored in the registers 706 and 708 for received segment data are input to a first comparator 703, together with the segment data read out from the segment database 705.

The communication apparatus 10 then causes the first comparator 703 to perform comparison processing in the same manner as in the first and second embodiments described above. A plurality of registers for the first comparison results, including the registers 710 and 711, is provided for each ID number, like the registers 706 and 708 for received segment data described above. The first comparator 703 outputs comparison results to the registers 710 and 711 for the first comparison results, respectively. The values stored in the registers 706 and 708 are input to the second comparator 704. In addition to these values, packet length information is input to the second comparator 704 when IP packets are processed, whereas window left edge information and a received ACK number are input to the second comparator 704 when TCP packets are processed.

The communication apparatus 10 causes the second comparator 704 to perform comparison processing based on the above input information. Based on this comparison result, the second comparator 704 notifies the completion of the reception of IP packets or the received states of TCP packets, as described in the first and second embodiments. Thereafter, the communication apparatus 10 causes the update unit 713 to perform registration/update processing for the segment database 705.

As described above, according to the fourth embodiment, providing a plurality of registers makes it possible to perform the processing in the first embodiment (determination of the completion of the reception of IP packets) and the second embodiment (determination of the received states of TCP packets) by one read operation in the segment database.

The present invention can determine the completion of the reception of fragment packets by using a simple, flexible arrangement as compared with an apparatus that does not have this arrangement.

The above embodiments are examples of typical embodiments of the present invention. However, the present invention is not limited to the embodiments described above and shown in the accompanying drawings, and can be modified and embodied, as needed, within the spirit and scope of the invention.

The present invention can take embodiments as a system, apparatus, method, program, storage medium, and the like. The present invention can be applied to a system including a plurality of devices, or to an apparatus including a single device.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293204 filed on Dec. 24, 2009 and No. 2010-245703 filed on Nov. 1, 2010, which are hereby incorporated by reference herein in their entirety.

What is claimed is:

1. A communication apparatus comprising:
   a receiving unit configured to receive a fragment packet divided from a TCP-based predetermined packet;
   an obtaining unit configured to obtain first left-edge address information and first right-edge address information which indicate a position of a TCP-based first fragment packet, within the predetermined packet, received by said receiving unit;
   a storage unit configured to store second left-edge address information and second right-edge address information which indicate a position of a TCP-based second fragment packet, within the predetermined packet, which is received by said receiving unit before the first fragment packet;
   a changing unit configured to change address information and length information of fragment packets, within the predetermined packet, which have been received by said receiving unit, based on the first left-edge address information, the first right-edge address information, the second left-edge address information, and the second right-edge address information; and
   a processing unit configured to perform a TCP-based predetermined packet reconfiguration process based on the address information and the length information changed by said changing unit.

2. A processing method for a communication apparatus, said method comprising:
   receiving a TCP-based fragment packet divided from a predetermined packet;
   obtaining first left-edge address information and first right-edge address information which indicate a position of a TCP-based first fragment packet, within the predetermined packet, received in said receiving step;
   storing second left-edge address information and second right-edge address information which indicate a position of a TCP-based second fragment packet, within the predetermined packet, which is received in said receiving step before the first fragment packet;
   changing address information and length information of fragment packets, within the predetermined packet, which have been received in said receiving step, based on the first left edge address information, the first right-edge address information, the second left-edge address information, and the second right-edge address information; and
   performing a TCP-based .predetermined packet reconfiguration process based on the address information and the length information changed in said changing step.

3. A non-transitory computer-readable storage medium storing a computer program for executed by a processor for causing a computer to function as:
   a receiving unit configured to receive a fragment packet divided from a TCP-based predetermined packet;
   an obtaining unit configured to obtain first left-edge address information and first right-edge address information which indicate a position of a TCP-based first fragment packet, within the predetermined packet, received by said receiving unit;
   a storage unit configured to store second left-edge address information and second right-edge address information which indicate a position of a TCP-based second fragment packet, within the predetermined packet, which is received by said receiving unit before the first fragment packet;
   a changing unit configured to change address information and length information of fragment packets, within the predetermined packet, which have been received by said receiving unit, based on the first left-edge address information, the first right-edge address information, the second left-edge address information, and the second right-edge address information; and
   a processing unit configured to perform a TCP-based predetermined packet reconfiguration process based on the address information and the length information changed by said changing unit.

4. A communication apparatus comprising:
an extraction unit configured to extract first left-edge address information and first right-edge address information which indicate a position of a TCP-based first fragment packet which is a packet divided from a TCP-based predetermined packet, within the predetermined packet before divide;
a memory configured to store second left-edge address information and second right-edge address information which indicate a position of a TCP-based second fragment packet, which had already been extracted by the extraction unit, within the predetermined packet before divide;
a comparison unit configured to compare the first left-edge address information with the second left-edge address information and/or the second right-edge address information, and compare the first right-edge address information with the second left-edge address information and/or the second right-edge address information;
a changing unit configured to change address information stored in the memory based on the comparison result by the comparison unit; and
a processing unit configured to perform a TCP-based predetermined packet reconfiguration process based on the address information and the length information changed by the changing unit.

5. A method for a communication apparatus, the method comprising:
an extraction step of extracting first left-edge address information and first right-edge address information which indicate a position of a TCP-based first fragment packet which is a packet divided from a TCP-based predetermined packet, within the predetermined packet before divide;
a storage step of storing a second left-edge address information and a second right-edge address information which indicate a position of a TCP-based second fragment packet, which had already been extracted in the extraction step, within the predetermined packet before divide;
a comparison step of comparing the first left-edge address information with the second left-edge address information and/or the second right-edge address information, and comparing the first right-edge address information with the second left-edge address information and/or the second right-edge address information;
a changing step of changing address information stored in the memory based on the comparison result obtained in the comparison step; and
a processing step of performing a TCP-based predetermined packet reconfiguration process based on the address information and the length information changed in the changing step.

6. A non-transitory computer-readable storage medium storing an executable program for causing a computer to execute a method, the method comprising:
an extraction step of extracting first left-edge address information and first right-edge address information which indicate a position of a TCP-based first fragment packet which is a packet divided from a TCP-based predetermined packet, within the predetermined packet before divide;
a storage step of storing second left-edge address information and second right-edge address information which indicate a position of a TCP-based second fragment packet, which had already been extracted in the extraction step, within the predetermined packet before divide;
a comparison step of comparing the first left-edge address information with the second left-edge address information and/or the second right-edge address information, and comparing the first right-edge address information with the second left-edge address information and/or the second right-edge address information;
a changing step of changing address information stored in the memory based on the comparison result obtained in the comparison step; and
a processing step of performing a TCP-based predetermined packet reconfiguration process based on the address information and the length information changed in the changing step.

* * * * *